(12) United States Patent
Schalk et al.

(10) Patent No.: US 11,167,496 B2
(45) Date of Patent: Nov. 9, 2021

(54) 3D PRINTING WITH MULTIPLE BUILD MODULES

(71) Applicant: HEWLETT-PACKARD DEVELOPMENT COMPANY, L.P., Houston, TX (US)

(72) Inventors: Wesley R Schalk, Vancouver, WA (US); Matthew A Shepherd, Vancouver, WA (US); Pierre J Kaiser, Vancouver, WA (US); Al Olson, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 627 days.

(21) Appl. No.: 16/074,217

(22) PCT Filed: Sep. 20, 2016

(86) PCT No.: PCT/US2016/052724
§ 371 (c)(1),
(2) Date: Jul. 31, 2018

(87) PCT Pub. No.: WO2018/056960
PCT Pub. Date: Mar. 29, 2018

(65) Prior Publication Data
US 2021/0138733 A1    May 13, 2021

(51) Int. Cl.
*B29C 64/393*   (2017.01)
*B29C 64/153*   (2017.01)
(Continued)

(52) U.S. Cl.
CPC ......... *B29C 64/393* (2017.08); *B29C 64/153* (2017.08); *B29C 64/165* (2017.08);
(Continued)

(58) Field of Classification Search
CPC ..... B29C 64/393; B29C 64/25; B29C 64/153; B29C 64/35; B29C 64/165; B33Y 30/00; B33Y 40/20; B33Y 10/00; B33Y 50/02
See application file for complete search history.

(56) References Cited

U.S. PATENT DOCUMENTS 5,622,577 A    4/1997    O'Connor
8,321,215 B2   11/2012   Alves et al.
(Continued)

FOREIGN PATENT DOCUMENTS

| DE | 102014016718 A1 | 5/2016 |
| DE | 102015200134 A1 | 7/2016 |
| RU | 2555281 C2 | 7/2015 |
| WO | 2014039378 A1 | 3/2014 |
| WO | WO2015/108545 A1 | 7/2015 |

OTHER PUBLICATIONS

"Getting Better Prints", 3DVerkstan Knowledge Base, Retrieved from Internet: < Http://support.3dverkstan.se/article/30-getting-better-prints#enable-cool-head-lift >, Apr. 17, 2015, pp. 1-24.

*Primary Examiner* — Nahida Sultana
(74) *Attorney, Agent, or Firm* — HP Inc. Patent Department

(57) ABSTRACT

According to one example, there is provided a method of generating three-dimensional objects in a three-dimensional printing system comprising a pair of movable build modules. The method comprises moving a first build module into a build position, executing a 3D print job in the first build module, moving the first build module into a post-build position, performing post-processing operations on the first build module, moving a second build module into the build position, and executing a 3D print job in the second build module.

13 Claims, 6 Drawing Sheets

(51) Int. Cl.
  *B33Y 10/00* (2015.01)
  *B33Y 30/00* (2015.01)
  *B33Y 50/02* (2015.01)
  *B29C 64/35* (2017.01)
  *B29C 64/165* (2017.01)
  *B29C 64/25* (2017.01)
  *B33Y 40/20* (2020.01)

(52) U.S. Cl.
  CPC .............. *B29C 64/25* (2017.08); *B29C 64/35* (2017.08); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | | |
|---|---|---|---|
| 8,668,859 | B2 | 3/2014 | Pettis |
| 2008/0118655 | A1* | 5/2008 | Kritchman ............ B29C 64/106 427/427.3 |
| 2010/0043698 | A1 | 2/2010 | Bolt |
| 2010/0140852 | A1 | 6/2010 | Kritchman et al. |
| 2013/0108726 | A1* | 5/2013 | Uckelmann ............ B33Y 50/02 425/174.4 |
| 2014/0065194 | A1* | 3/2014 | Yoo ....................... B29C 64/165 424/400 |
| 2014/0074274 | A1 | 3/2014 | Douglas et al. |
| 2017/0136700 | A1* | 5/2017 | Li ........................... A61L 27/60 |
| 2021/0107220 | A1* | 4/2021 | Hernandez ............. B33Y 50/00 |

* cited by examiner

3D PRINTING WITH MULTIPLE BUILD MODULES

BACKGROUND

Additive manufacturing, more commonly known as three-dimensional or 3D printing, enables objects to be generated on a layer-by-layer basis. 3D printing techniques may generate layers of an object by forming successive layers of a build material on a build platform, and selectively solidifying portions of each layer of the build material.

BRIEF DESCRIPTION

Examples will now be described, by way of non-limiting example only, with reference to the accompanying drawings, in which.

Figure 5:
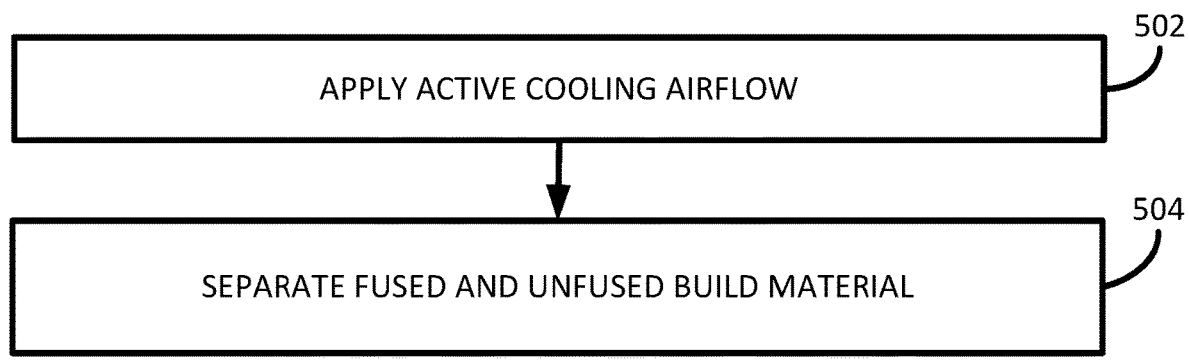
Figure 6A:
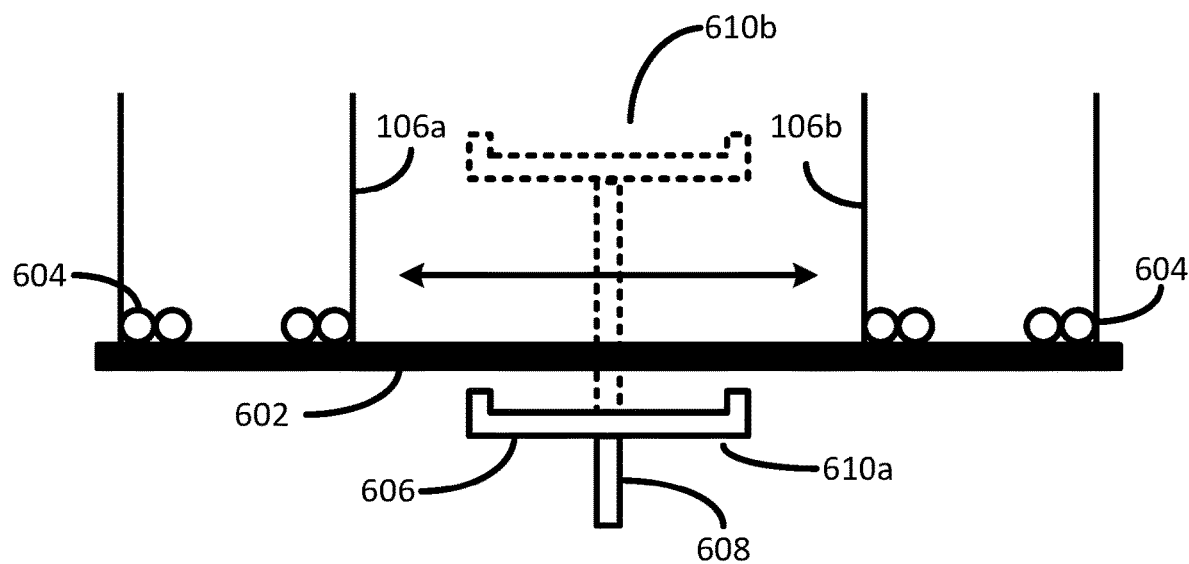
Figure 6B:
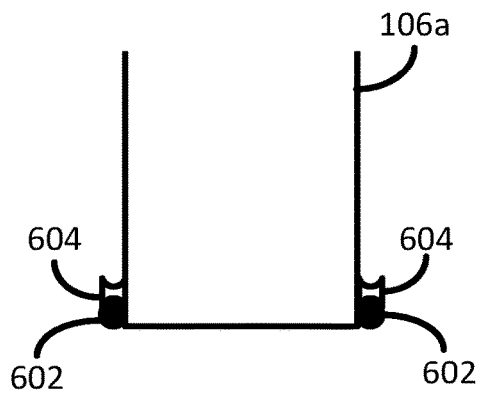

FIGS. 4A, 4B, 4C, and 4D are block diagrams of example post-processing modules;

FIG. 5 is a flow diagram outlining an example method of post-processing;

FIGS. 6A and 6B show an illustration of a portion of a 3D printing system according to one example.

DETAILED DESCRIPTION

In some sectors there is a drive to move 3D printing away from its more traditional use in low-volume rapid prototyping, into the higher volume and more industrial-scale space. Allowing 3D printers to produce higher volumes of high quality objects will enable them to better compete with more traditional manufacturing techniques such as injection molding. However, as some 3D printing techniques remain relatively slow, improving the throughput of 3D printers becomes increasingly important.

Figure 1:
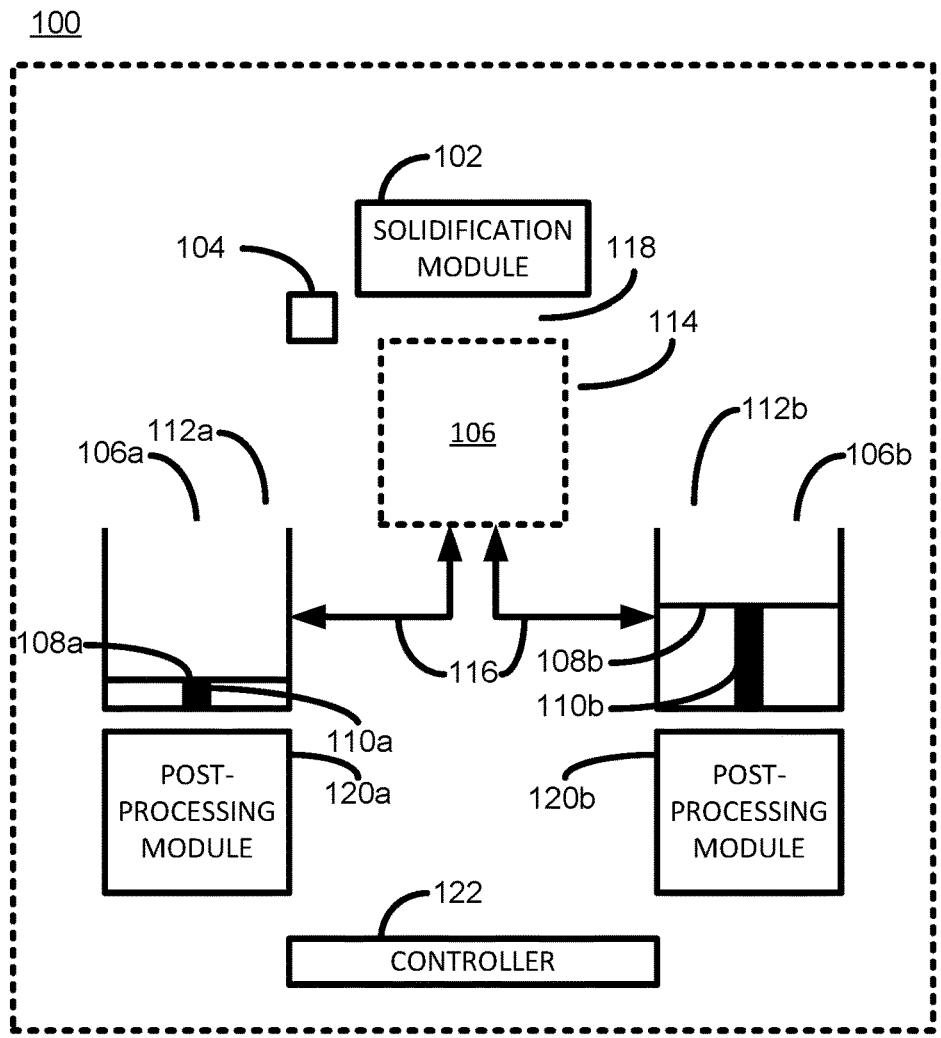
FIG. 1 is a schematic diagram of a 3D printing system according to one example.

Referring now to FIG. 1, there is a shown a simplified schematic view of a 3D printing system 100 according to one example.

The 3D printing system 100 comprises a 3D printing solidification module 102 to cause the selective solidification of portions of a layer of build material formed on a support platform of a build module, when a build module is positioned in a build position. Layers of build material may be formed on a support platform of a build module by a build material distribution module 104. In one example, build material may be a suitable powdered or granular build material. In one example a build material distribution module 104 may be a roller or a wiper. Build material may be supplied from, for example, an overhead hopper, or from a separate build material store (not shown).

The selective solidification module 102 may be controlled in accordance with a print job or suitable digital representation of a 3D object to be printed to form a 3D object in a layer-by-layer process. The solidification module 102 may be any suitable kind of selective solidification system which may include, for example, a fusing agent and fusing energy system, a selective laser sintering (SLS) system, a selective inhibition sintering (SIS) system, a binder/powder system, or the like.

The 3D printing system 100 comprises a pair of automatically movable build modules, or build units, 106a and 106b. The build modules 106 are the modules within which three-dimensional objects may be generated by the 3D-printing system 100. Each of the build modules 106 are movable within the 3D printing system 100 between a number of different positions or zones, as indicated by arrows 116. It will be appreciated that the direction of movement shown by arrows 116 is purely exemplary, and other directions of movement may be used in other examples. In one example, each of the build modules 106a and 106b are movable between a respective post-processing or post-build position (112a and 112b), as illustrated in FIG. 1, and a build position 114. In FIG. 1 a build module 106 is shown in dotted outline in the build position 114. When in the build position 114 the build module may be said to be in a build zone 118. In one example, only a single build module 106 may be positioned in the build position 114 at one time. Each of the build modules 106 may be moved, for example, by any suitable controllable motorized drive mechanism.

In the example shown, the build position 114 is shown at a higher level than the level of the post-processing position 112. However, the relative positions of the post-processing positions 112a, 112b, and the build position, may be different in different examples. In one example, the build position and post-processing positions may be located at substantially the same level, whereas in another example, the level of each of the positions may be different.

Each of the build modules 106 comprises a generally open-topped cuboidal housing in which is provided a vertically, or z-axis, movable platform (108a, 108b). Each support platform is movable by a respective drive mechanism (110a, 110b).

When positioned in a respective post-processing position (112a, 112b) each build module (106a, 106b) may be connected or coupled to a post-processing module 120, for example using a suitable mechanical interface.

In one example, the 3D printing system 100 may comprise a pair of post-processing modules 120a and 120b for use with each respective build module. In another example, each build module (106a, 106b) may be connected or coupled to a single post-processing module 120. The post-processing module(s) 120 performs post-processing operations of a build module 106. Post-processing operations may include, for example, forced or active cooling of the contents of a build module 106, and at least partial separation of fused and unfused build material.

In one example, the build modules 106a and 106b are integrated components of the 3D printing system 100 and are not intended to be removed therefrom.

Figure 2:
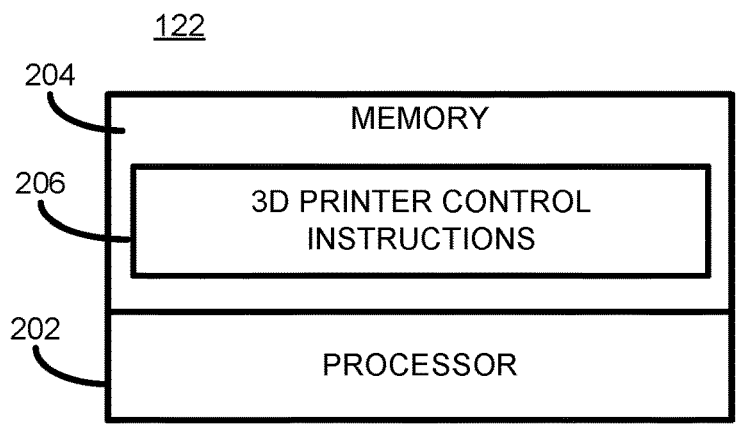
FIG. 2 is a block diagram of a 3D printing system controller according to one example.

The operation of the 3D printing system 100 is controlled by a controller 122. The controller 122 is shown in greater detail in the block diagram of FIG. 2. The controller 122 comprises a processor 202, such as a microprocessor. The processor 202 is coupled to a memory 204, for example through a suitable communications bus (not shown). The memory 204 stores processor understandable 3D printer control instructions 206 that, when executed by the processor 202, cause the controller 122 to control the 3D printing system 100 as described herein.

Figure 3:
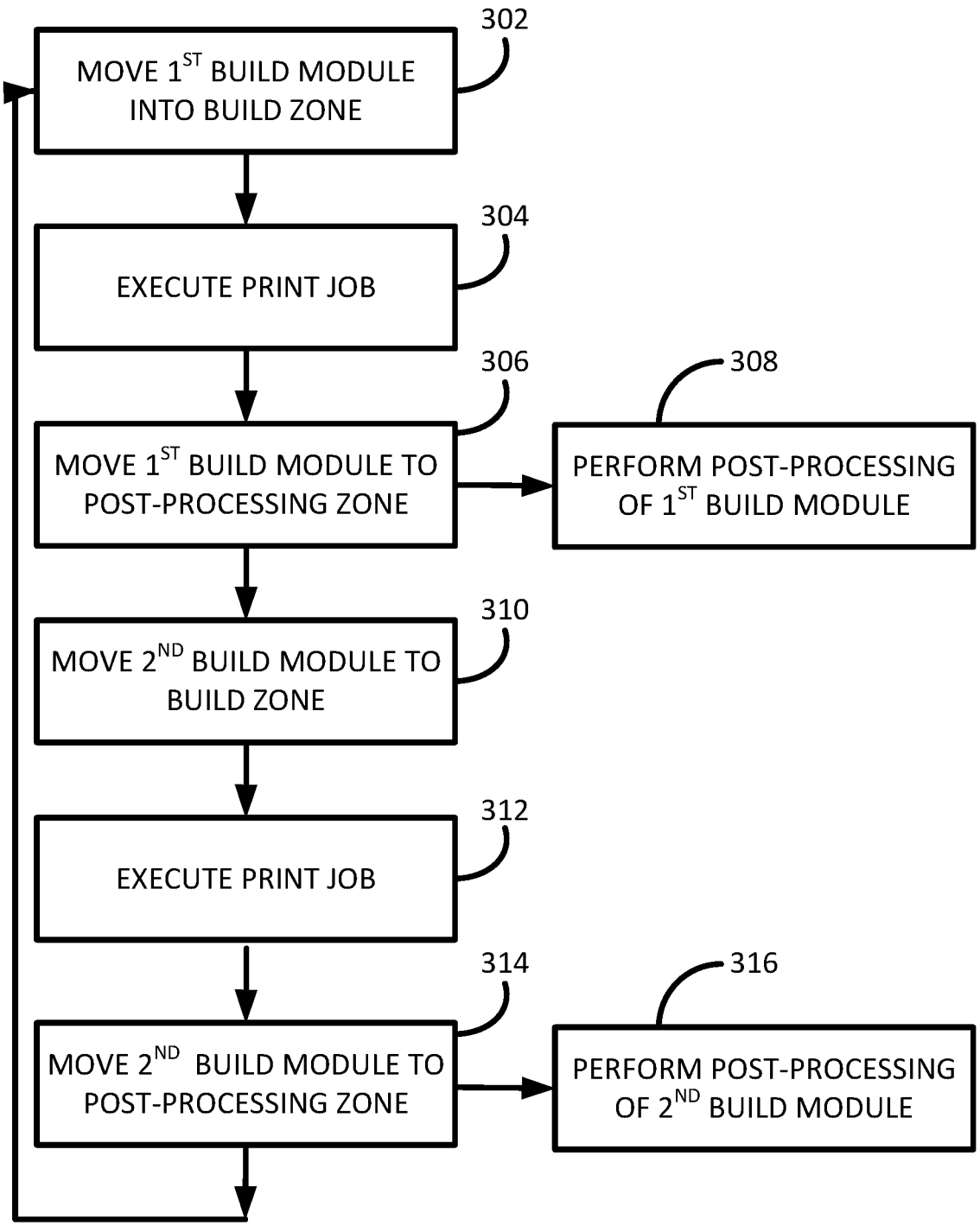
FIG. 3 is a flow diagram outlining an example method of controlling a 3D printing system according to one example.

A detailed example operation of the 3D printing system 100 will now be described with additional reference to the flow diagram of FIG. 3.

At block 302, the controller 122 controls the first build module 106a to move into the build position 114. The controller 122 also ensures that the support platform 108a of the build module 106a is at a predetermined upper starting position, ready to receive a layer of powder thereon. The second build module 106*b* will be controlled to move into its post-processing position 112*b* if it is not already so positioned.

At block 304, the controller 122 executes a print job. The print job may have been previously obtained by the controller 122 in any suitable manner. The controller 122 executes the print job by controlling the build material distributor to form a layer of build material on the support platform 108*a* of the build module 106*a*, and controlling the solidification module 102 to selectively solidify portions of the formed layer of build material in accordance with data or instructions within the print job. After each layer of build material has been processed, the controller 122 controls the support platform 108*a* to lower by a predetermined distance, to allow a subsequent layer of build material to be formed thereon. These operations may be repeated until a 3D object is generated. The print job may comprise data that defines, or is derived from, a 3D object model of a 3D object to be generated.

The manner in which the solidification module 102 is controlled may be dependent on the type of solidification system used. For example, if the solidification system 102 is a selective laser sintering system, the solidification system 102 may be controlled to pre-heat the formed layer of build material to near its melting temperature, and then to apply a focused laser beam to portions of the layer of build material that are to form a layer of the 3D object being generated to cause those portions to fuse and solidify. If, for example, the solidification system 102 is a fusing agent and fusing energy system, the controller 122 may control the solidification system to pre-heat the formed layer of build material to near its melting temperature, to selectively apply a fusing agent to portions of the formed layer of build material, and then to apply fusing energy to the formed layer of build material such that portions of the build material on which fusing agent were applied fuse and solidify.

At block 306, when the print job has been executed, the controller 122 controls the build module 106*a* to move to its post-processing position 112*a* and to connect or couple to its associated post-processing module 120*a*.

At block 308, the controller 122 controls the post-processing module 120*a* to perform appropriate post-processing operations on the first build module 106*a*. In one example, as shown in the flow diagram of FIG. 5, the controller may apply (502) active cooling to the contents of a build module, and may separate (504) fused and unfused build material from a build module. In other examples other post-processing operations may be performed.

In one example, when the post-processing operations have been completed the first build module 106*a* is ready to be used again to generate further 3D objects.

The controller 122 may control the post-processing operations to be performed on the first build module 106*a* in parallel with the further operations described below.

At block 310, the controller 122 controls the second build module 106*b* to move into the build position 114.

At block 312, the controller 122 executes a print job. The print job may have been previously obtained by the controller 122 in any suitable manner. The controller 122 executes the print job by controlling the build material distributor to form a layer of build material on the support platform 108*b* of the build module 106*b*, and controlling the solidification module 102 to selectively solidify portions of the formed layer of build material in accordance with data or instructions within the print job, as described above. These operations may be repeated until a 3D object is generated.

At block 314, when the print job has been executed, the controller 122 controls the build module 106*b* to move to its post-processing position 112*b* and to connect or couple to its associated post-processing module 120*b*.

At block 316, the controller 122 controls the post-processing module 120*b* to perform appropriate post-processing operations on the second build module 106*b*. The controller 122 may control the post-processing operations on the second module 106*b* in parallel with other operations, as described herein. When the post-processing operations have been completed the second build module 106*b* is ready to be used again to generate further 3D objects.

The controller 122 may then repeat the above-described operations.

In one example, the controller 122 controls the post-processing operations such that the post-processing operations being performed on one of the build modules 106 have terminated before or at the same time as the execution of a print job in the other one of the build modules 106. In this way, the 3D printing system 100 may be controlled to function in a continuous manner which reduces the amount of time that the 3D printing system 100 is not 3D printing objects. Furthermore, the operation of the 3D printing system 100 is substantially autonomous and may function for long periods of time without user intervention.

Referring now to FIG. 4 there are shown a number of examples of different post-processing modules 120.

The post-processing module 120 may perform any suitable post-processing operations on a build module to enable the build module to be prepared ready to be reused in a further 3D printing operation.

Figure 4A:
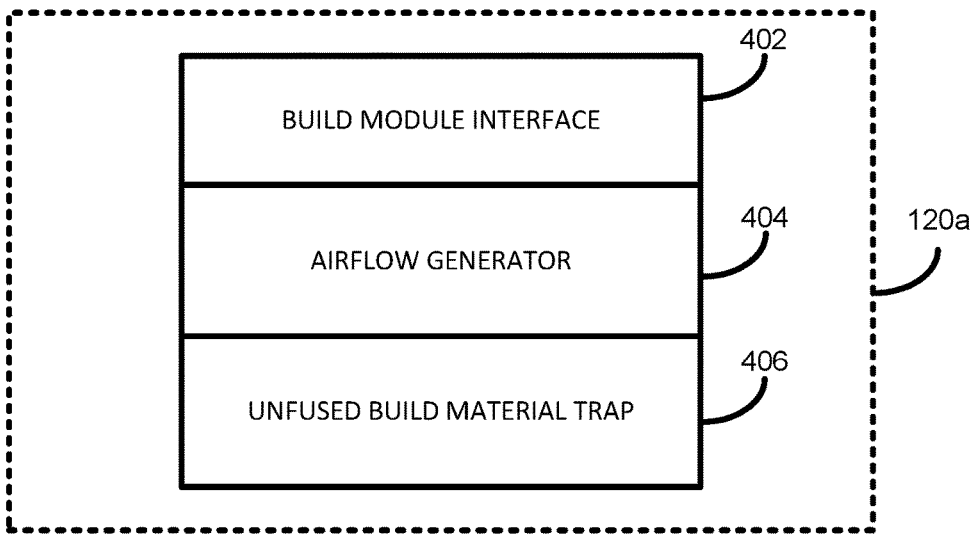

One example of a post-processing module 120*a* is shown in the block 35 diagram of FIG. 4A. The post-processing module 120*a* comprises a build module interface 402 to enable a build module 106 to couple thereto. In this example, the interface provides a fluidic interface to couple a build module 106 to an airflow generator 404. The interface may comprise, for example, suitable connections and sealing members (not shown), valves, etc. to enable the build module 106 to releasably connect to the post-processing module 106. In one example the connectors are suitable press-to-fit type connectors. In some examples motorized elements may be used to assist in the connection and release of a build module 106 to/from the build module interface 402.

Once connected to the build module interface 402, the controller 122 may control operation of the airflow generator 404. The airflow generator 404 may, for example, be used to provide a negative pressure airflow through the build module 106 such that ambient air is sucked through at least a portion of build material within the build module 106 and into the airflow generator. The build modules 106 may be provided with suitable air intakes and connections to the post-processing module 120. In one example, control of the speed of the airflow may provide cooling to the contents of the build module 106 and may also remove unfused build material from the build module 106. Any unfused build material within the airflow may be separated from the airflow by an unfused build material trap 406. An unfused build material trap may, for example, comprise an air cyclone type element, a filter, or any suitable particulate removal system. In one example, airflow from the build module 106 is directed to the unfused build material trap prior to being directed to the airflow generator 404 to prevent unfused build material from entering the airflow generator. In one example, the airflow generator is an air pump or fan.

The controller 122 may control the speed of the airflow generated by the airflow generator 404 to provide cooling to the contents of the build module 106 in a controlled manner. For example, the controller 122 may cause the airflow generator 404 to generate a relatively low airflow for a first period of time, for example to provide a cooling airflow through the contents of the build module 106 without undue removal of unfused build material. The controller 122 may then cause the airflow generator 404 to generate a relatively high airflow for a second period of time to provide an airflow through the contents of the build module 106 with the aim of removing a substantial portion of any unfused build material within the build module 106. The manner in which the airflow is controlled to perform both cooling and unfused build material extraction may be based, for example, on data relating to the contents of build module.

In the example of FIG. 4A, after post-processing, any 3D printed objects are available in the build module 106, substantially separated from any non-fused build material, for example ready for removal by a user.

Figure 4B:
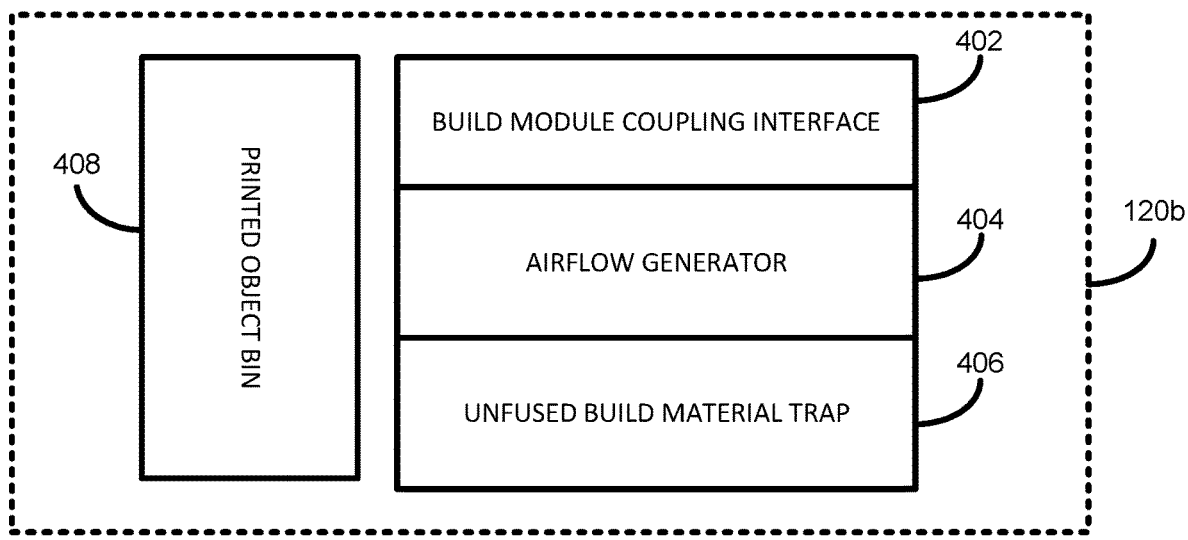

In a further example, illustrated in FIG. 4B, a post-processing module 120b additionally comprises a 3D printed object bin 408 into which, after post-processing, any 3D printed object in the build module 106 may be transferred automatically, thereby automatically readying the build module 106 for further use. In one example, 3D printed objects may be transferred to the printed object bin for example by the controller 122 causing the build platform 108 of the build module 106 to rise, and controlling a wiper or pusher mechanism (not shown), for example, to move any 3D printed objects from the build module 106 to the 3D printed object bin 408.

In one example, the controller 122 controls the post-processing operations performed by the post-processing module 120 to take a time less than or equal to the time it takes to execute a print job in a build module in the build position 114. In this way, when a print job has finished, a post-processed build module is ready to be moved into the build position 114 to enable a print job to be executed therein, whilst the build module in which the recently finished print job was executed is moved into its post-processing position for post-processing.

Figure 4C:
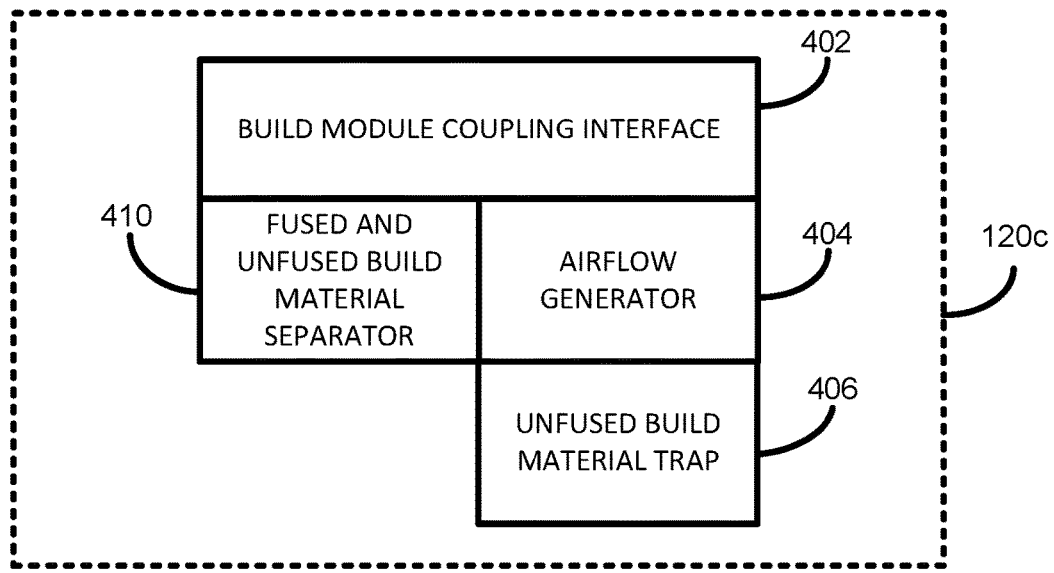

In a further example, illustrated in FIG. 4C, a post-processing module 120c additionally comprises a fused and unfused build material separator 410. The material separator 410 may comprise, for example, a sieving mechanism and may enable at least some unfused build material to be removed from a build module 106 by actuation of a vibrator element (not shown). In one example, the controller 122 may initially control the airflow generator 404 to generate a cooling airflow, and after a period of time may control a vibrator element to vibrate such that any unfused build material in the build module 106 may be extracted. In one example, extraction of unfused build material may be achieved by a combination of a sieving type mechanism and a forced airflow.

Figure 4D:
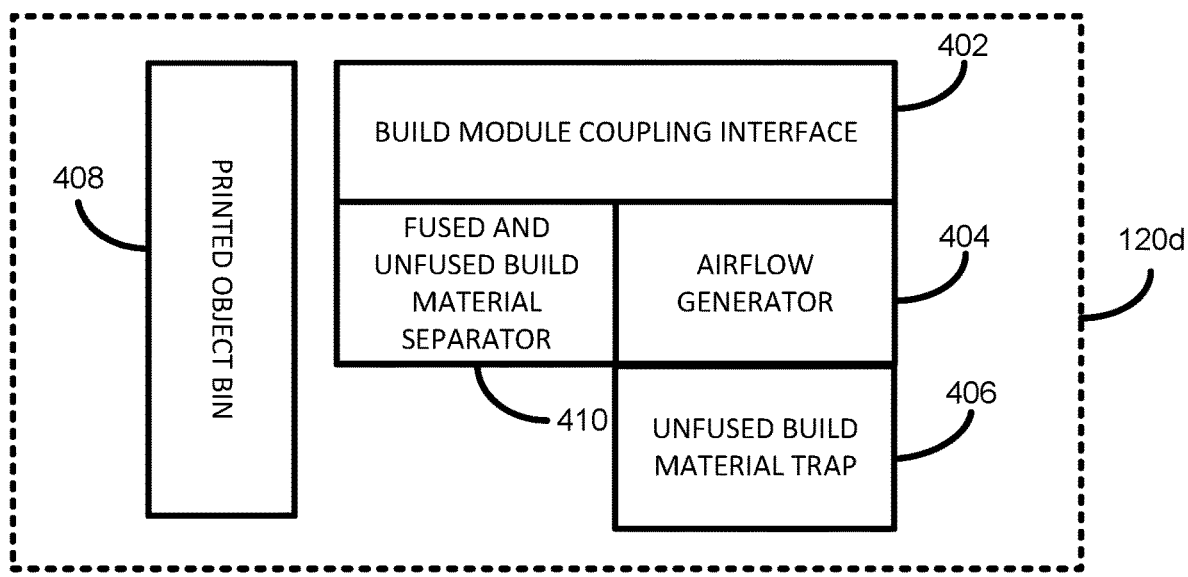

In a further example, illustrated in FIG. 4D, a post-processing module 120d additionally comprises a 3D printed object bin 408 into which, after post-processing, any 3D printed object in the build module 106 may be transferred automatically, as described above.

To enable each of the build modules 106 to move within the 3D printing system 100 each build module 106 may be mounted on rails, as illustrated in FIGS. 6A and 6B. For example, one or a pair of rail(s) or tube(s) 602 may be provided within the 3D printing system 100 and each of the build modules 106 may be provided with runners 604. Using such a system enables a build module to be raised, if appropriate, to a build position 114 using a relatively simply configuration.

As shown in FIG. 6A a build module lifting platform 606 may be provided between the rails 602 and that is connected to a suitable drive mechanism 608, such as a piston, screw drive, etc. When in a lowered position 610a the lifting platform 606 does not interfere with movement of the build modules 106 along the rails 602. The lifting platform 606 may be raised to a raised position 610b, shown in dotted lines, to move a build module 106 positioned thereon to the build position 114.

Although examples described herein relate to a 3D printing system having two build modules, in other examples additional build modules could be provide along with, if appropriate, additional post-processing modules or post-processing positions.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples of the present invention may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A three-dimensional printing system comprising:
   a pair of moveable build modules;
   a build material distributor to form a layer of build material on a support platform of a build module when positioned in a build zone;
   a selective solidification module to selectively solidify portions of a formed layer of build material in the build zone;
   an active cooling system at a post-build zone to actively cool down content of the build module;
   and
   a controller to:
     move a first build module into the build zone;
     execute a 3D print job in the first build module;
     move, after execution of the 3D print job, the first build module to the post-build zone;

move the second build module into the build zone;
execute a 3D print job in the second build module; and
control the active cooling system to cool the content of the first build module at the post-build zone while executing the 3D print job in the second build module at the build zone.

2. The system of claim 1, wherein each build module comprises a movable support platform on which successive layers of build material may be formed and selectively solidified.

3. The system of claim 2, wherein the drive mechanism for the build platform of each build module is contained within each build module.

4. The system of claim 1, wherein the printing system comprises a first post-build zone for the first build module, and a second separate post-build zone for the second build module.

5. The system of claim 1, wherein execution of the 3D print job comprises:
controlling the build material distributor and selective solidification module to generate a 3D object in the build module in accordance with the 3D print job.

6. The system of claim 1, wherein the build modules are movable along a guide element such as a rail or tube.

7. The system of claim 1, wherein each of the build modules are moveable independently.

8. The system of claim 1, wherein the selective solidification module is a thermal-based selective solidification module such as a laser sintering or fusing agent and irradiation system.

9. The system of claim 1, wherein each post-build zone comprises a post-build module to which the build module is connected when the build module is moved into the post-build zone.

10. The system of claim 1, wherein the post-build module comprises a build material separation system to extract non-solidified build material from the build module.

11. A method of generating three-dimensional objects in a three-dimensional printing system comprising multiple movable build units, comprising:
positioning a first build unit in a build position;
performing a 3D print job in the first build unit;
positioning the first build unit in a post-build position;
performing post-processing operations on the first build unit, including performing active cooling on contents of the first build unit;
positioning a second build unit in the build position; and
performing a 3D print job in the second build unit, while performing the active cooling on the contents of the first build unit.

12. The method of claim 11, further comprising positioning the second build unit in a post-build position and performing post-processing operations of the second build unit.

13. The method of claim 11, wherein performing post-processing operations further comprises performing an extraction of unfused build material from the contents of a build unit.

* * * * *